United States Patent
Carter, Jr. et al.

(10) Patent No.: US 6,289,258 B1
(45) Date of Patent: Sep. 11, 2001

(54) DRAIN FLOWRATE MEASUREMENT

(75) Inventors: William Thomas Carter, Jr., Galway; Russell Scott Miller, Ballston Spa; Mark Gilbert Benz, Burnt Hills; Robert John Zabala, Schenectady; Bruce Alan Knudsen, Amsterdam, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/221,721

(22) Filed: Dec. 28, 1998

(51) Int. Cl.⁷ ...................................... G06F 19/00
(52) U.S. Cl. .................. 700/145; 700/117; 700/282; 75/10.14; 75/10.24; 73/861
(58) Field of Search ...................... 700/282, 283, 700/145, 117; 65/326, 376, 382, 384, 488, 491; 75/10.14, 10.24; 373/72, 79, 115, 142; 348/135, 138, 92; 382/100; 73/861.05, 861; 250/559.03, 559.08, 559.24, 559.32, 573; 222/593

(56) References Cited

U.S. PATENT DOCUMENTS

| | | | |
|---|---|---|---|
| 4,090,241 | * 5/1978 | Houston | 700/117 |
| 4,297,893 | * 11/1981 | Weinstein | 73/861 |
| 5,160,532 | 11/1992 | Benz et al. | 75/10.24 |
| 5,170,060 | * 12/1992 | Maillard et al. | 250/559.03 |
| 5,170,438 | * 12/1992 | Anger et al. | 382/100 |
| 5,649,992 | * 7/1997 | Carter, Jr. et al. | 75/10.14 |
| 5,809,057 | 9/1998 | Benz et al. | 373/142 |

* cited by examiner

Primary Examiner—Paul P. Gordon
Assistant Examiner—Steven R. Garland
(74) Attorney, Agent, or Firm—Noreen C. Johnson; Douglas E. Stoner

(57) ABSTRACT

The flowrate of a stream discharged from a drain in a vessel is measured by imaging the stream, measuring a diameter of the stream image, and calculating the flowrate based on the measured diameter. A video camera may be aimed below the drain for imaging the stream. A computer is joined to the camera for measuring the diameter of the stream and calculating a corresponding flowrate therefor. Either the pressure head above the drain or the profile of the stream below the drain may be used in calculating the discharge stream flowrate

7 Claims, 2 Drawing Sheets

DRAIN FLOWRATE MEASUREMENT

This invention was made with government support under Contract No. F33615-96-2-5262 awarded by DARPA. The government may have certain rights to the invention.

BACKGROUND OF THE INVENTION

The present invention relates generally to electroslag refining, and, more specifically, to control thereof.

Electroslag refining (ESR) may be used for melting and refining iron, nickel, or titanium based alloys. The unrefined alloy is provided in the form of an ingot electrode which is suspended inside a water-cooled copper crucible. A suitable slag is disposed at the bottom of the crucible and is electrically resistively heated and melted, with the molten or liquid slag then being used to melt the lower tip of the electrode immersed therein. A power supply is electrically joined to the crucible and the electrode, and electrical current flows through the electrode, molten slag, and crucible for resistively heating the slag which melts the ingot tip as it is lowered into the crucible during operation.

Droplets of the molten electrode fall by gravity through the molten slag and undergo refining in which oxide inclusions in the metal are removed by and dissolved in the molten slag. The refined metal is denser than the slag and accumulates at the bottom of the crucible, with the slag floating thereatop.

The bottom of the crucible includes a cold-walled induction-heated guide tube (CIG) having a central orifice drain through which a liquid stream of the refined metal may be drained by gravity from the crucible. This refined stream is an ideal liquid metal source for many solidification processes including powder atomization, spray deposition, investment casting, melt-spinning, strip casting, and slab casting.

Since the melt temperature of the discharge stream is substantial, variations in the drain rate affect the solidification of the stream as it is deposited in the subsequent solidification processes such as spray deposition. Relatively slow draining increases solidification speed, and fast draining decreases solidification speed, with both extremes adversely affecting material properties of the solidified metal.

The flowrate, or pour rate, of the draining stream should match the melt rate and is affected by the diameter of the drain, the pressure heads of the molten metal and liquid slag thereatop, and the differential pressure above the slag and below the drain. The drain diameter is affected by the thickness of the skull of solidified molten metal in the drain, which in turn is affected by the amount of induction heating energy supplied into the drain.

The pressure heads of the molten metal and slag are affected by their respective heights, with the molten metal height being variable, with the slag height typically being a constant. And, the differential pressure inside and outside the crucible is controlled by the respective gas pressures thereat.

U.S. Pat. No. 5,809,057-Benz et al discloses an exemplary apparatus for electroslag refining, and subsequent spray atomization, over which the present invention is an improvement. Since the drain rate is affected by many operating parameters, it will vary unless those parameters are controlled.

Accordingly, it is desired to measure the drain rate of the crucible for controlling the electroslag refining process, for in turn controlling and optimizing the metallurgical properties of the resulting solidified metal.

BRIEF SUMMARY OF THE INVENTION

The flowrate of a stream discharged from a drain in a vessel is measured by imaging the stream, measuring a diameter of the stream image, and calculating the flowrate based on the measured diameter. A video camera may be aimed below the drain for imaging the stream. A computer is joined to the camera for measuring the diameter of the stream and calculating a corresponding flowrate therefor. Either the pressure head above the drain or the profile of the stream below the drain may be used in calculating the discharge stream flowrate.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
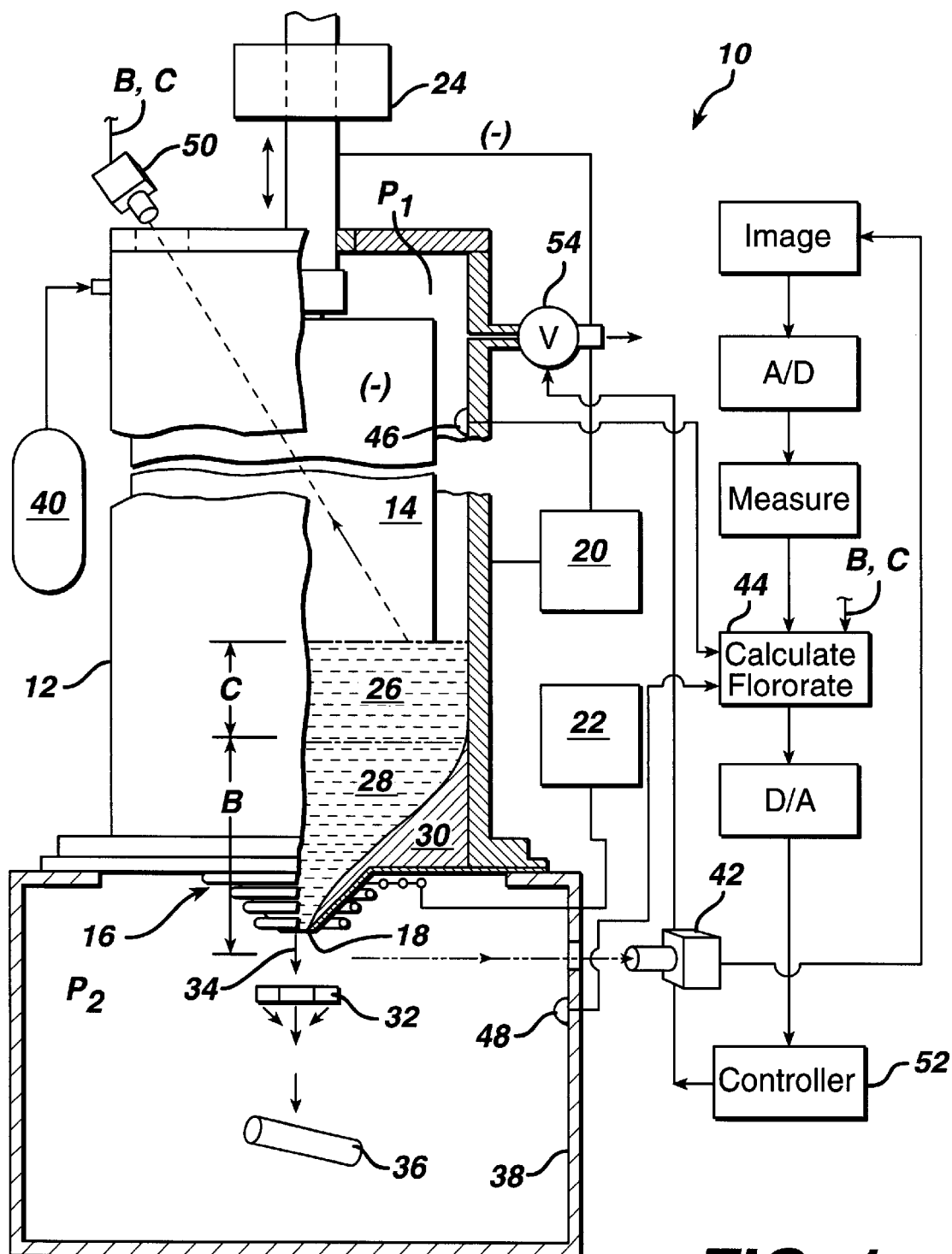
FIG. 1 is a schematic elevational view of an electroslag refining apparatus including melt stream flowrate measurement in accordance with an exemplary embodiment of the present invention.

Illustrated schematically in FIG. 1 is an electroslag refining (ESR) apparatus 10 in accordance with an exemplary embodiment of the present invention. The apparatus includes a water cooled crucible 12, which also defines a pressure vessel, in which is vertically received an ingot electrode 14 of an unrefined metal alloy for undergoing electroslag refining. The alloy may be iron, nickel, or titanium based for example.

Disposed at the bottom of the crucible is a cold-wall induction-heated guide tube (CIG) 16 having a central orifice defining a bottom drain 18.

An electrical power supply 20 is joined by suitable leads to the electrode 14 and crucible 12. A separate power supply 22 is operatively joined to the tubular induction heaters of the guide 16 surrounding the drain 18.

The electrode 14 is suspended inside the crucible by an elevator 24 having a vertically translatable output shaft extending though the top wall of the crucible for selectively lowering the electrode therein as the electrode tip is consumed during operation.

A suitable slag 26, initially in solid form, is melted to develop a pool of molten slag in the crucible through which electrical current from the power supply 20 is passed between the electrode 14 and crucible for heating the slag and in turn melting the electrode tip. As the tip melts, molten droplets therefrom are refined as they fall by gravity through the lower density molten slag 26 and accumulate therebelow in a pool of refined molten metal 28. Since the crucible 12 and guide 16 are water cooled, a portion of the melt 28 solidifies in a skull 30 along the inner surfaces thereof including the drain 18. The solidified skull protects the melt 28 from contamination by the crucible and guide typically formed of copper.

The refined metal 28 may be drained from the crucible and used for various subsequent operations as indicated above including metal spray forming. As shown in FIG. 1, a gas atomizer 32 is suspended below the drain 18 for receiving therethrough the discharged melt stream 34 which is sprayed against a preform 36 for building thereatop solidified layers of the refined metal as the preform is rotated during operation. The spray forming atomizer and preform are protected inside an enclosure or chamber 38 mounted below the crucible 12.

Correspondingly, the crucible 12 is closed to provide a controlled environment in which the electroslag refining takes place. A gas supply 40 may be joined to the crucible to provide an inert gas, such argon, therein. The environment inside the crucible is maintained at a first pressure P1, and the environment inside the spray forming chamber 38 is maintained at another pressure $P_2$, which typically are different.

The metallurgical properties of the spray deposited refined metal atop the preform 36 are affected by the solidification temperature thereof. If the deposited metal solidifies too quickly or too slowly, the metallurgical properties will degrade. Solidification temperature, in turn, is affected by the discharge flowrate, or pour rate of the melt stream from the drain 18. A high pour rate slows the solidification rate on the preform, and a slow pour rate increases the solidification rate on the preform.

The pour rate from the drain 18 is affected by the diameter of the skull 30 in the drain 18, and may be varied by varying the induction heating energy. The pour rate is also affected by the corresponding pressure heads of the melt and slag pools atop the drain, and the differential pressure, $P_1-P_2$, inside the crucible above the pools and inside the spray chamber below the drain.

The electroslag refining apparatus and spray forming as so described are conventional in configuration and operation, and may be like that described in the above identified patent. However, the present invention is an improvement thereover, for controlling the melt drain rate for subsequent solidification.

In accordance with the present invention, the flowrate of the melt stream 34 discharged through the drain 18 is measured using a video camera 42 and cooperating digitally programmable computer 44 configured in software specifically therefor.

Figure 2:
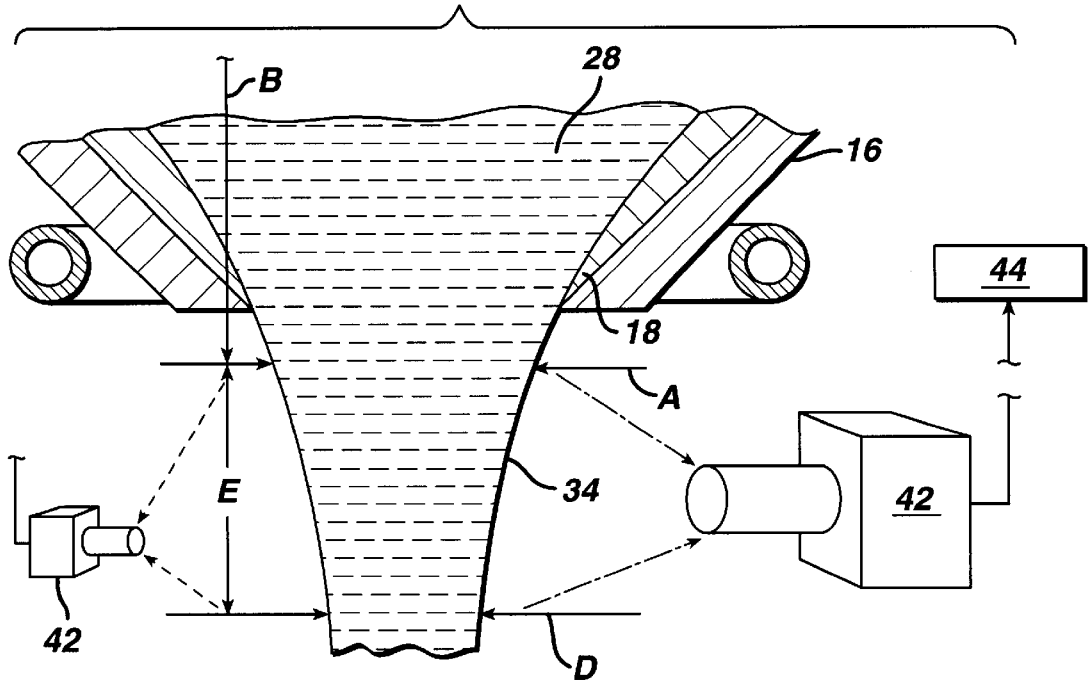
FIG. 2 is an enlarged elevational view of the melt stream discharge from the drain of the apparatus illustrated in FIG. 1, with flowrate measurement in accordance with an alternate embodiment of the present invention.

The video camera 42 is aimed through a corresponding window in the spray chamber 38 below the drain 18 and provides means for imaging the discharged melt stream 34. The video camera 42 may take any conventional form such as a charge injection device (CID) commercially available from CID Technologies, Inc., Kissimmee, Fla., under model No. 3100, which has a resolution of about 500×500 pixels. The camera preferably has a suitable lens system for providing a close up, full field view of the melt stream 34 as illustrated in FIG. 2.

As the melt stream 34 free falls by gravity upon leaving the drain 18, it accelerates and increases in velocity and its diameter simultaneously decreases in a converging profile. The drain 18 is preferably circular, and the corresponding diameter of the melt stream 34 decreases as it drops in elevation upon discharge. The video camera 42 may be used for measuring the discharge flowrate of the melt stream 34 in various manners by measuring the geometry or configuration of the free falling stream.

The flowrate of the stream, as represented by its mass flowrate, is simply the product of its density, cross-sectional flow area, and velocity thereat. The flow area is simply the area of the circular profile of the stream at a specific radius or diameter which decreases as the stream falls, and velocity increases.

Accordingly, the camera 42 may be used for measuring diameter of a captured stream image, with this diameter being in turn used to calculate the flowrate of the stream, with the velocity thereof being directly or indirectly included.

As initially shown in FIG. 2, the camera 42 may be aimed at the stream 34 below the drain 18 for producing an image thereof from which a first diameter A may be measured. This first diameter is at any reference section of the stream, with the melt 28 having a height B extending upwardly thereabove to the top of the melt pool as illustrated in FIG. 1. The melt pool therefor has a corresponding hydrodynamic pressure head which controls the discharge velocity and flowrate. The velocity and flowrate are also controlled by the height C of the slag pool floating atop the melt pool which has a corresponding hydrodynamic pressure head.

As shown in FIG. 1, the velocity and flowrate of the melt stream 34 are also affected by the differential pressure $P_1-P_2$, above the melt and slag inside the crucible and below the stream outside the crucible in the spray chamber 38.

The stream velocity at the reference section diameter A may be represented by the following equation:

$$V=C_d(2(P_1-P_2)/\rho_m+2g\ (B+(\rho_s/\rho_m)C))^{1/2} \quad (1)$$

In Equation 1, $C_d$ is the drag coefficient which may be empirically determined; $\rho_m$ and $\rho_s$ are the respective densities for the melt stream and slag. And, the discharge flowrate is simply the product of the melt stream density, velocity V at the reference section, and the corresponding area of the circle of diameter A.

In order to measure the differential pressure, a first pressure sensor 46 is mounted in the crucible above the slag level and is operatively joined to the computer 44. A second pressure sensor 48 is mounted inside the spray chamber 38 and is operatively joined to the computer 44.

Since the height C of the slag 26 illustrated in FIG. 1 is preferably a constant, the height B of the melt 28 may be determined in any conventional manner such as by mounting a second video camera 50 at the top of the crucible for viewing through a suitable window therethrough downwardly inside the crucible to determine the elevation or height at the top of the slag pool 26. By simply subtracting the height C of the slag from the measured elevation at the top of the pool, the height B of the melt 28 may be determined down to the reference section at which the stream diameter A is measured by the first camera 42.

Accordingly, the computer 44 may be suitably configured in software for calculating the discharge flowrate of the melt stream based on the measured diameter A and velocity of the stream at the corresponding reference section, with the velocity being calculated based on the differential pressure $P_1-P_2$ and pressure heads of the melt and slag above the reference section.

The two video cameras 42,50 and two pressure sensors 46,48 are therefore effective for accurately measuring variable parameters during operation from which the velocity and flowrate of the discharge melt stream 34 may be accurately computed. The remaining parameters in the calculation are simply constant for a particular refining apparatus and operating batch.

As shown in FIG. 1, the first video camera 42 may be used in any suitable manner to capture an image of the melt stream 34 with a corresponding analog-to-digital (A/D) conversion of the signal therefrom for processing in the computer. The imaging software may be configured to define the outer profile of the melt stream as distinguished from the background, and as distinguished from any noise or errors within the profile.

The diameter A at the reference section of the captured image may then be determined and combined with the measured pressures and height of the melt pool to calculate the velocity and mass flowrate of the discharged melt stream. The resulting data may then undergo suitable digital-to-analog (D/A) conversion for being suitably displayed in visual form for observation, or for subsequent use in a system controller 52 specifically configured for controlling operation of the electroslag refining process and spray forming.

Although the first embodiment of the invention illustrated in FIG. 1 may be used for accurately determining melt stream velocity and flowrate, it requires the empirical generation of the drag coefficient, measuring differential pressure across the drain, and measuring the elevation of the slag surface in the crucible. The process may be substantially simplified to eliminate many of these measurements in determining the melt stream flowrate.

As indicated above with respect to FIG. 2, the melt stream 34 converges as it drops by gravity and may be mathematically defined using Bernoulli's principle. The video camera 42 may be used in this embodiment to measure two diameters of the melt stream 34, such as the first diameter A and a second diameter D, spaced vertically apart at a distance or height E, with all three parameters being accurately measured by the same video camera 42.

The melt stream flowrate, designated F, may be represented by the following equation:

$$F = \rho_m \pi A^2 / 4 (2gE/((A/D)^4 - 1))^{1/2} \quad (2)$$

The computer 44 may be suitably configured in software to solve the second equation, with the various parameters therein being constant except for the two diameters A,D and vertical spacing therebetween E, which are measured by the camera 42. The discharge flowrate F of the melt stream is thusly directly calculated using only three variables, all obtained from the single camera 42.

This embodiment of the invention is more sensitive to the outer profile of the converging melt stream 34 illustrated in FIG. 2. In order to improve accuracy of flowrate measurement, a second one of the video cameras 42 may be used in conjunction with the first one thereof and mounted along orthogonal axes to view and measure the melt stream 34 from different angles. In this way, duplicate values of the two measured diameters A,D and measured height E may be obtained which may be individually averaged, or the resulting flowrate separately calculated therefrom and used separately or averaged together for improving accuracy of flowrate calculation.

Figure 3:
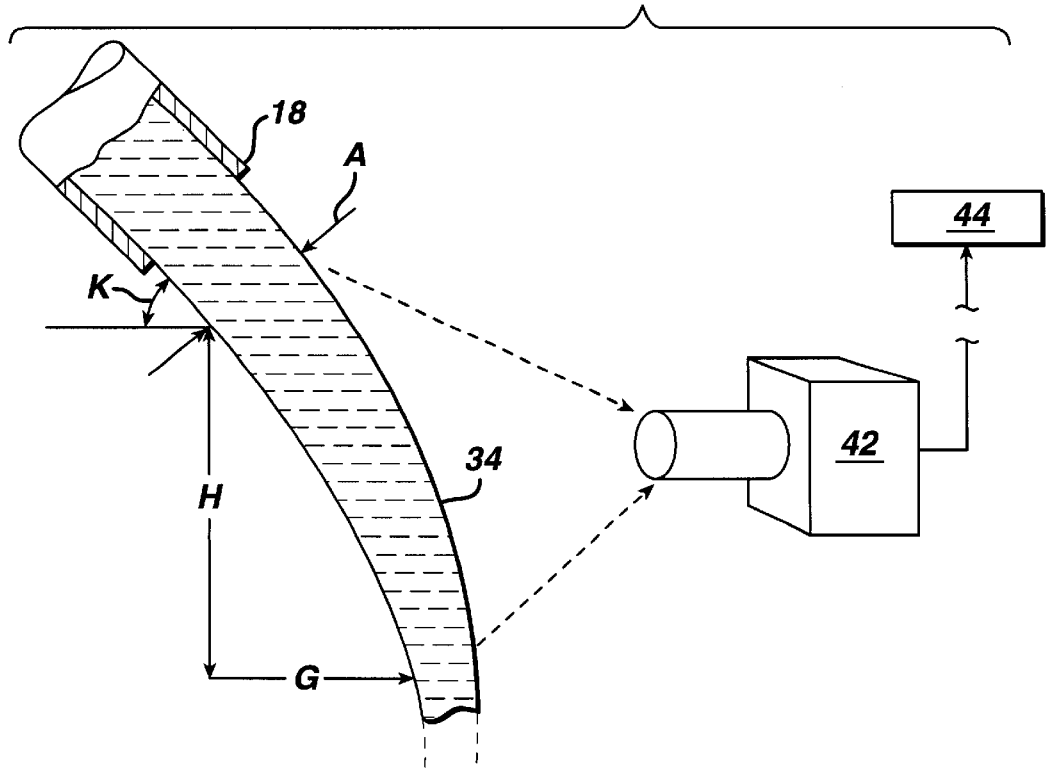
FIG. 3 is an inclined drain, with measurement of the discharge stream flowrate therefrom in accordance with another embodiment of the present invention.

FIG. 3 illustrates yet another embodiment of the present invention which may be used for measuring the flowrate of the stream 34 which is discharged both horizontally and vertically downwardly from the drain 18 being correspondingly inclined. In the first two embodiments disclosed above with respect to FIGS. 1 and 2, the stream 34 falls by gravity solely vertically downwardly. In FIG. 3, the stream 34 is initially discharged with a horizontally directed complement so that the stream must bend downwardly as it falls by gravity.

The discharge flowrate for this embodiment may be calculated using the following equation:

$$F = \rho_m \pi A^2 / 4 (gG^2/2 \cos K(H - G \tan K))^{1/2} \quad (3)$$

The camera 42 is again used to provide an image of the arcuate melt stream 34 for measuring the diameter A at the reference section; a horizontal offset G of the stream image at a corresponding measured height H below the reference section; and an inclination angle K at the reference section. All of these measurements may be made along the lower edge of the stream image. This measured data is combined with the constants in Equation 3 to directly calculate the resulting flowrate of the inclined melt stream based on the measured diameter, height, offset, and inclination angle.

Referring again to FIG. 1, any one of the three exemplary embodiments disclosed above may be used for providing an accurate determination of the pour rate or flowrate of the melt stream 34 discharged from the drain 18, which may then undergo atomization spray forming atop the preform 36.

The so calculated flowrate may then be fed to the system controller 52 for controlling the melt stream flowrate in a feedback closed-loop. In this way, the pour rate may be maintained substantially constant during the spray forming process for improving the metallurgical properties of the spray-formed refined metal.

Feedback control may be effected in various manners. For example, a solenoid driven outlet valve 54 may be disposed in flow communication with the crucible 12 for selectively venting the pressurized gas therein to control the inside pressure $P_1$. The outlet valve 54 is operatively joined to the controller 52 and may be varied in response to the calculated flowrate. The pressure inside the crucible may be varied by controlling the outlet valve 54 for in turn varying the differential pressure across the drain 18 for maintaining constant the melt stream pour rate even though other parameters in the electroslag refining process may vary.

Alternatively, the controller 52 may be joined to either power supply 20,22 to control the melting rate of the electrode 14 or the thickness of skull 30 in the drain 18 by varying heating thereof.

Accordingly, what is desired to be secured by letters patent of the united states is the invention as defined and differentiated in the following claims in which we claim:

1. A method for measuring flowrate of a stream discharged from a drain in a vessel comprising:

imaging said stream;

measuring a diameter of said stream image;

measuring differential pressure above and below said stream inside and outside said vessel, respectively;

measuring a height of said stream relative to a reference section thereof at said measured diameter, and calculating said flowrate based on said measured diameter and velocity of said stream at said reference section, and said velocity is calculated based on said differential pressure and pressure head above said reference section including said stream height thereabove.

2. A method according to claim 1 further comprising:

measuring two of said diameters of said stream image spaced apart from each other by said measured height; and calculating said flowrate based on said two measured diameters and measured height.

3. A method according to claim 1 wherein said vessel is an electroslag refining crucible, and said stream is molten metal refined therein, and further comprising controlling said flowrate in a feedback closed-loop.

4. An apparatus for electroslag refining an ingot electrode comprising:

a crucible for receiving said electrode, and having a bottom drain for discharging a molten metal stream as said electrode is melted and refined;

a video camera aimed below said drain for imaging said stream;

means for measuring differential pressure above and below said stream inside and outside said crucible, respectively;

means for measuring a height of said stream above a reference section at said measure diameter; and a computer operatively joined to said camera and configured for measuring a diameter of said stream image, and calculating a flowrate based on said measured diameter and velocity of said stream at said reference section, and said velocity is calculated based on said differential pressure and pressure head above said reference section including said stream height thereabove.

5. An apparatus according to claim 4 wherein said computer is configured for:

measuring two of said diameters of said stream image spaced apart from each other by said measured height; and calculating said flowrate based on said two measured diameters and measured height.

6. A method for measuring flowrate of a stream discharged from a drain in a vessel, comprising:

imaging said stream discharged from a drain in a vessel;

measuring inclination angle of said stream image at said reference section;

measuring horizontal offset of said stream image at said measured height below said reference section;

measuring a height of said stream relative to a reference section thereof at said measured diameter, and calculating said flowrate based on said measured diameter, height, offset, and angle.

7. An apparatus for electroslag refining an ingot electrode comprising:

a crucible for receiving said electrode, and having a bottom inclined drain for discharging a molten metal stream both horizontally and vertically as said electrode is melted and refined, a video camera aimed below said drain for imaging said stream and a computer operatively joined to said camera and configured for:

measuring a diameter of said stream image, an inclination angle of said stream image at said reference section:

measuring horizontal offset of said stream image at said measured height below said reference section; and calculating said flowrate based on said measured diameter, height, offset, and angle.

* * * * *